United States Patent [19]
Wagner et al.

[11] 4,165,099
[45] Aug. 21, 1979

[54] REAR SUSPENSION APPARATUS FOR A MOTOR VEHICLE

[75] Inventors: David A. Wagner, Southfield; Daniel W. Doran, Troy; Robert C. Emenaker, Mt. Clemens, all of Mich.

[73] Assignee: Chrysler Corporation, Highland Park, Mich.

[21] Appl. No.: 855,499

[22] Filed: Nov. 28, 1977

[51] Int. Cl.² ............................................. B60K 17/32
[52] U.S. Cl. ................... 280/708; 267/11 R; 267/15 R
[58] Field of Search ................. 301/132; 267/11, 112, 267/15, 20; 280/702, 708, 709, 710, 711, 712, 713, 725

[56] References Cited
U.S. PATENT DOCUMENTS

| | | | |
|---|---|---|---|
| 2,637,568 | 5/1953 | Booth | 267/11 R |
| 3,085,817 | 4/1963 | Krause | 267/11 R |
| 3,768,584 | 10/1973 | King | 267/15 R |

*Primary Examiner*—Philip Goodman
*Attorney, Agent, or Firm*—Baldwin & Newtson

[57] ABSTRACT

A suspension apparatus for the rear wheels of a motor vehicle includes a pair of control arms pivotally connected to the vehicle frame or body at one end and rotatively supporting the wheels by an improved structure which mechanically entraps a wheel spindle at the other end and a transverse torsion member extending between the control arms at a longitudinal position intermediate the ends. The torsion member is formed as a downward opening U-shaped channel member to position its shear center above the pivotal axis of the control arms to effect an understeer handling characteristic and is supported adjacent the control arms by gusset plates.

6 Claims, 10 Drawing Figures

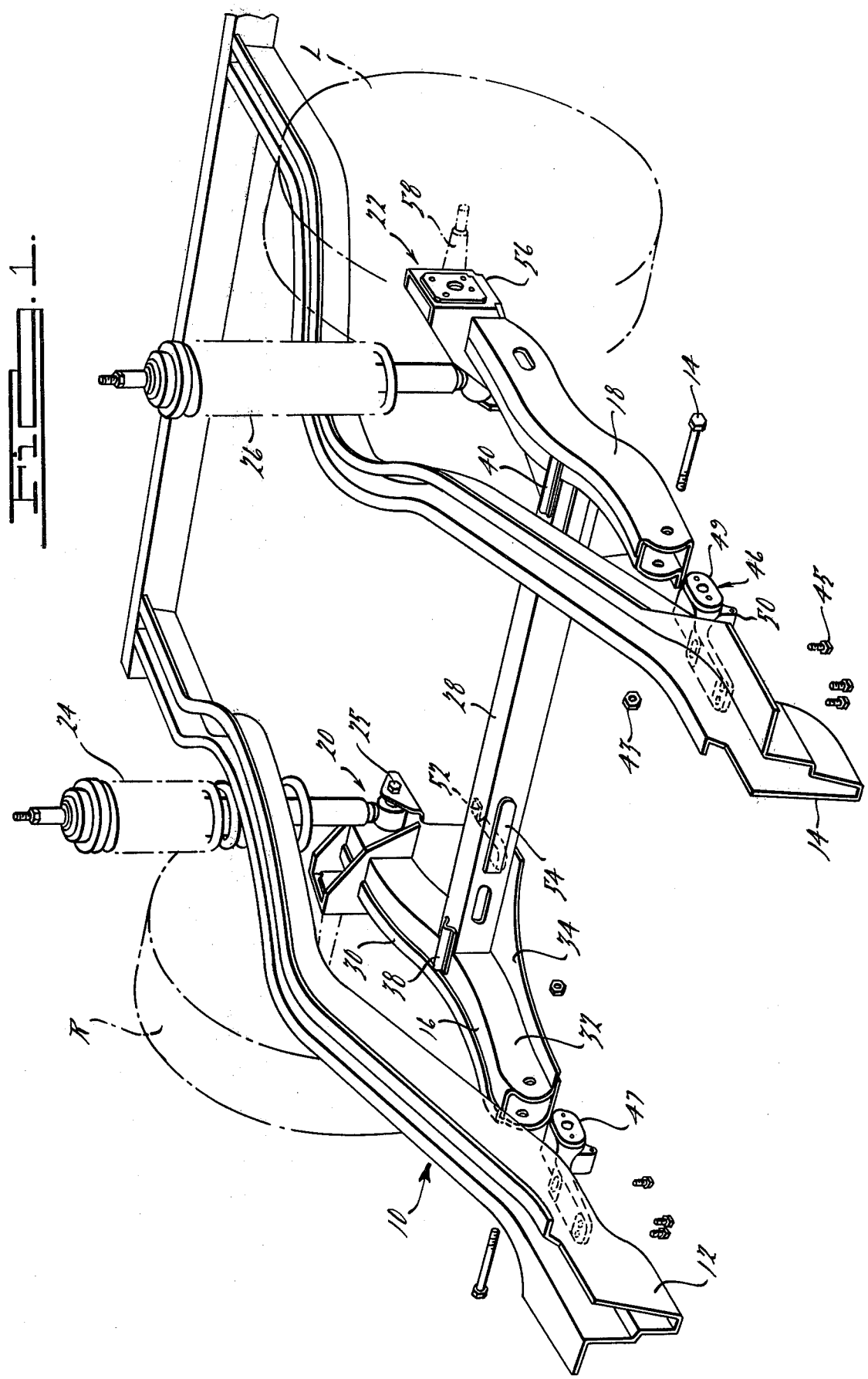

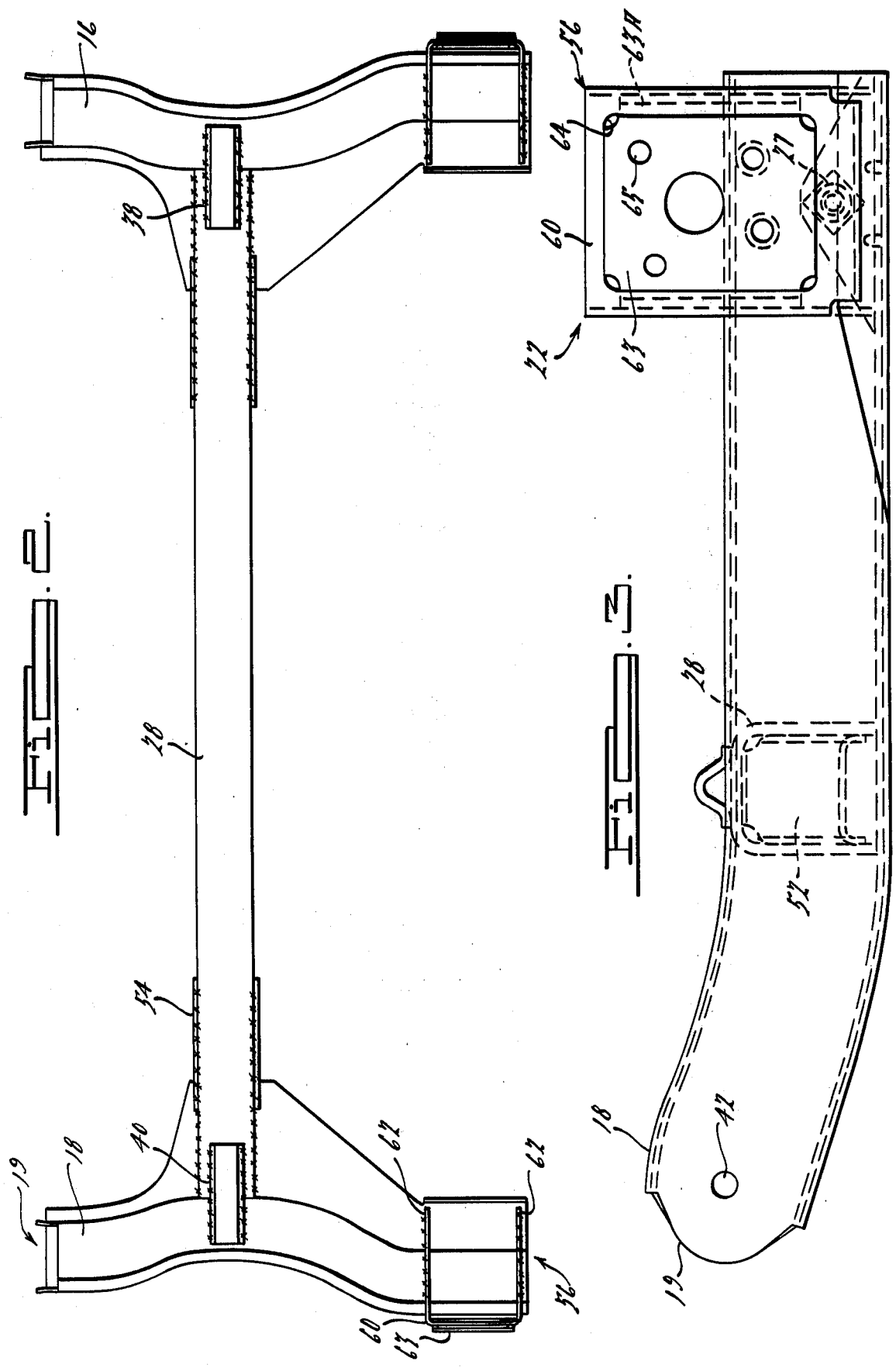

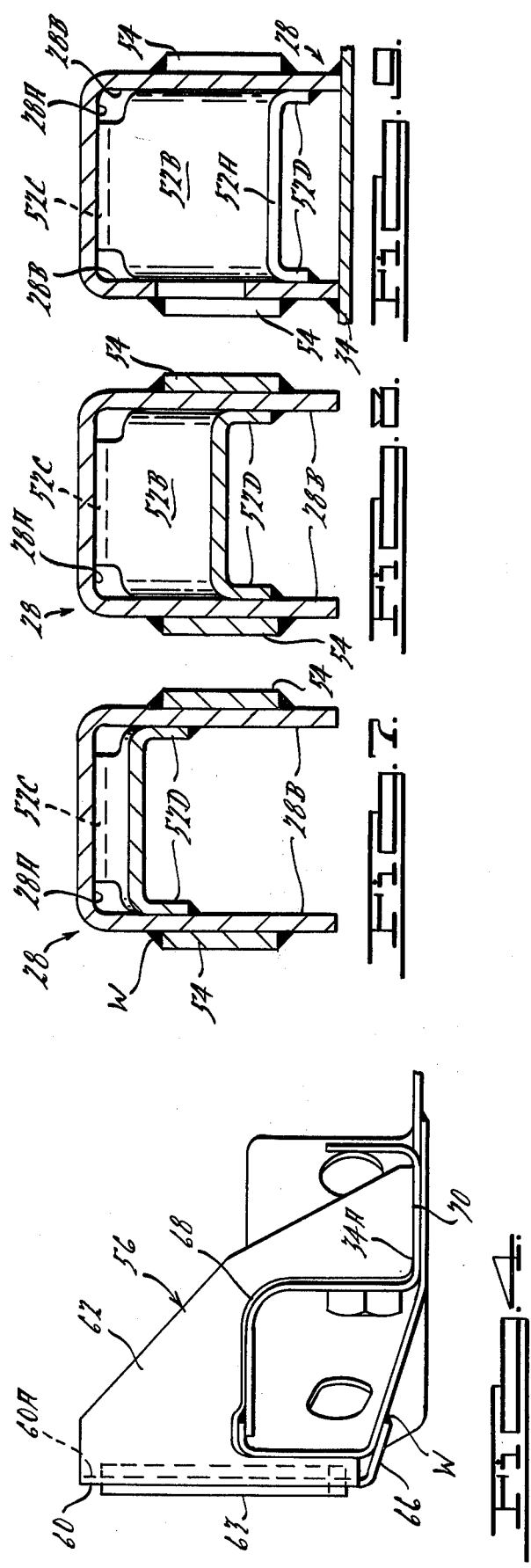
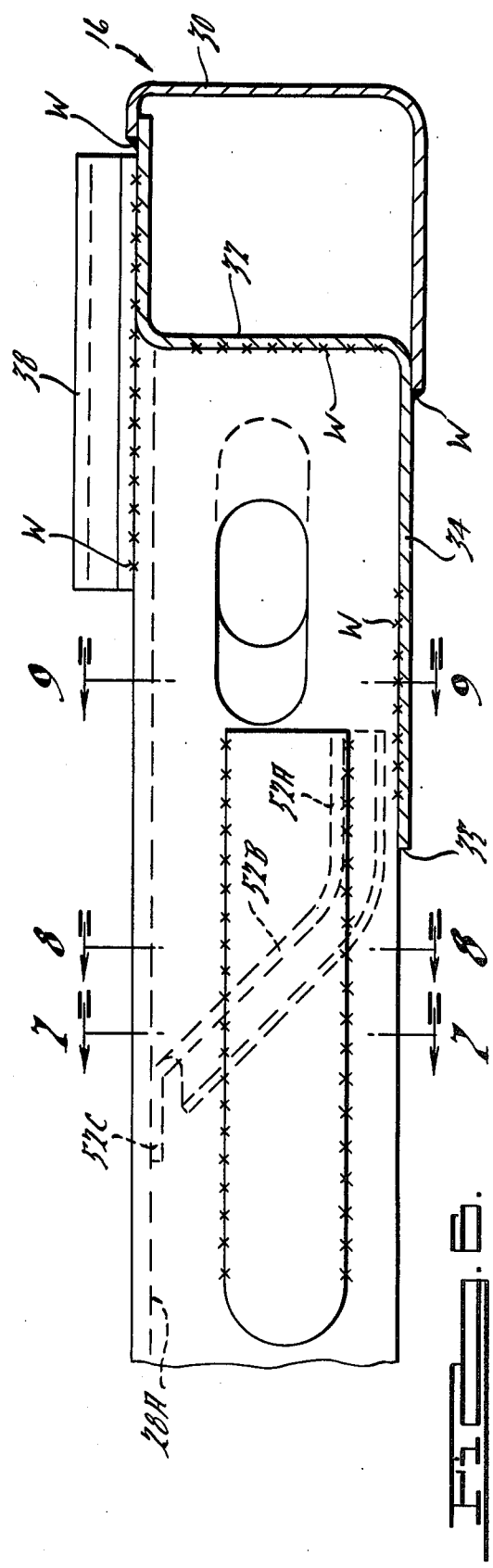

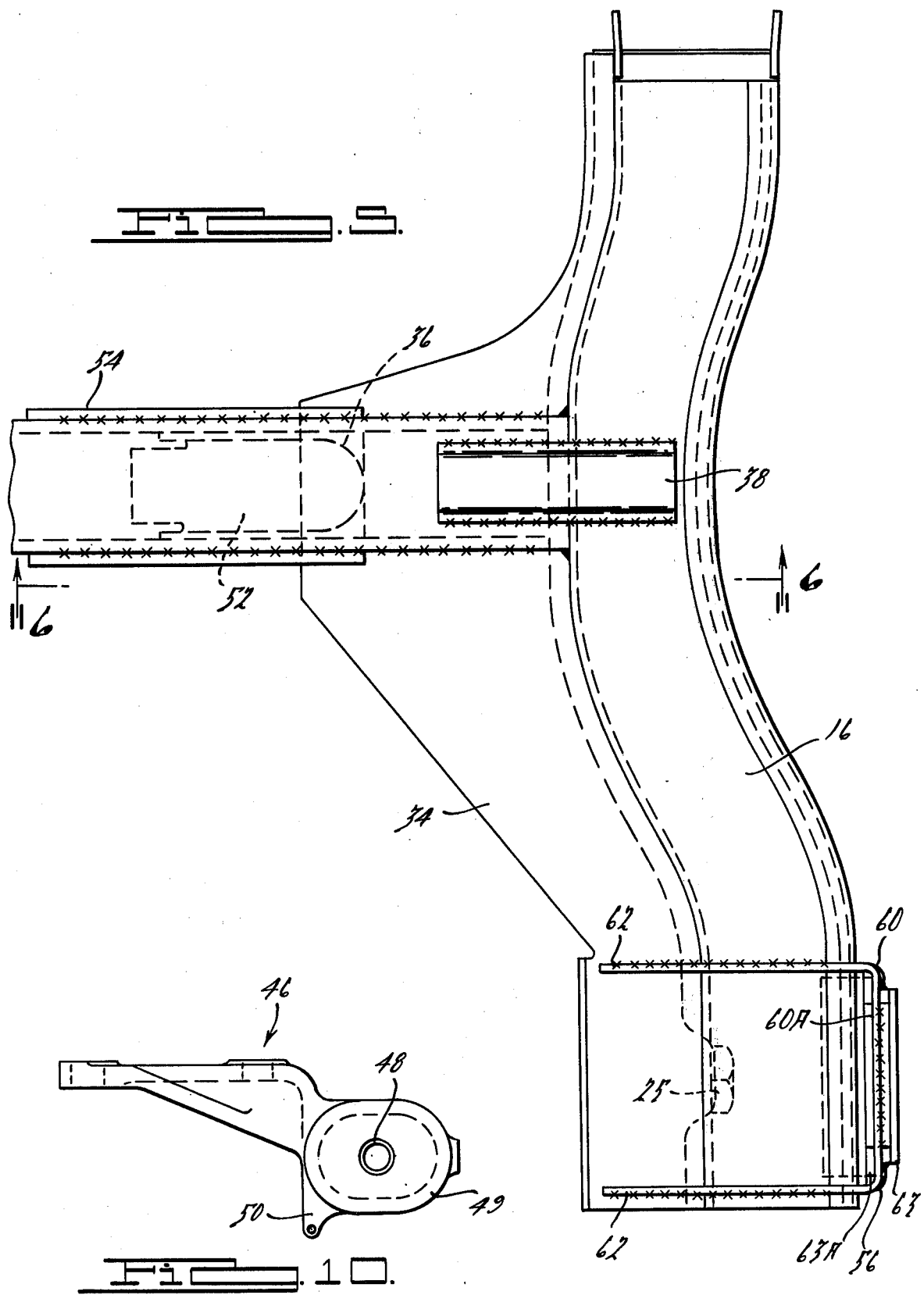

REAR SUSPENSION APPARATUS FOR A MOTOR VEHICLE

BACKGROUND OF THE INVENTION

1. Field of Invention

The present invention relates generally to wheel suspension systems for motor vehicles and more specifically an independent suspension system with a transversely extending torsion member for the rear wheels of a motor vehicle employing a front wheel drive system.

2. Description of the Prior Art

Suspension systems for rear, non-driven wheels of motor vehicles which employ semi-independent pivotally mounted control arms for supporting the wheels and a torsion member extending transversely between the control arms are known in the art. U.S. Pat. No. 3,767,224, issued Oct. 23, 1973 is exemplary of these prior art systems. The rear wheel suspension system of the present invention is directed at improving the known prior art systems in certain respects such as economy of manufacture, steering characteristics, and strength and reliability of the wheel supporting structure.

It is accordingly an object of the present invention to provide a highly economically producible rear wheel suspension system for a motor vehicle of the type having a pair of control arms pivotally mounted to the vehicle frame and rotatively supporting the wheels, having a torsion member extending transversely between the control arms.

It is another object to provide in the suspension system a transverse torsion member configured to permit achieving a desired understeer characteristic in the vehicle.

It is yet another object to provide in the suspension system a wheel support apparatus having improved strength and reliability characteristics.

According to one feature of the invention a rear wheel suspension system is provided in which a simple U-shaped channel member is employed as the transversely extending torsion member, being positioned longitudinally intermediate the ends of the pivotally mounted control arms.

According to another feature the transverse torsion member is positioned such that its shear center is above the pivotal axis of the control arms without positioning the torsion member itself above the pivotal axis to produce a desired understeer effect in the vehicle.

According to yet another feature an improved wheel support apparatus is provided which includes improved means for effecting attachment to the control arms whereby strength and reliability of the assembly is improved over prior art systems.

BRIEF DESCRIPTION OF THE DRAWINGS

These and other objects and features will become apparent to those skilled in the vehicle wheel suspension art upon reading the following description with reference to the accompanying drawings in which:

FIG. 1 is a perspective, partially exploded view of a rear wheel suspension apparatus according to the present invention;

FIG. 2 is a top view of the cross member, control arms, and wheel support apparatus of the present invention;

FIG. 3 is a left side elevational view of the apparatus of FIG. 2;

FIG. 4 is an end view of the wheel support structure of FIG. 3;

FIG. 5 is an enlarged view of one side of the invention apparatus of FIG. 2;

FIG. 6 is a cross sectional view taken along line 6—6 of FIG. 5;

FIG. 7 is a cross sectional view taken along line 7—7 of FIG. 6;

FIG. 8 is a cross sectional view taken along line 8—8 of FIG. 6;

FIG. 9 is a cross sectional view taken along line 9—9 of FIG. 6; and

FIG. 10 is a side elevational view of a hanger member of the FIG. 1 embodiment.

DESCRIPTION OF THE PREFERRED EMBODIMENT

Referring now to the drawings, and in particular to FIG. 1, a suspension system 10 is illustrated as being carried by a pair longitudinally extending side rails 12, 14 of the frame of a motor vehicle for supporting the vehicle wheels L,R. It will be understood, however, that the system 10 might also be carried by other frame or body members.

The suspension system 10 consists essentially of a pair of trailing control arms 16, 18 pivotally connected in a manner to be later further described to the side rails 12, 14, respectively; a pair of wheel support assemblies 20, 22 for supporting the wheels L, R at the ends of control arms 16, 18 opposite their pivotal connection to the side rails 12, 14, a pair of shock absorbers and spring assemblies 24, 26 of known design interconnected between the wheel support apparatus and the motor vehicle body (not shown); and a cross member 28 secured to and extending transversely between the control arms 16, 18. As the description progresses, it should be understood that because of the symmetry of the invention suspension apparatus about the longitudinal centerline of the vehicle, in many cases prolixity is avoided by describing only one of a pair of identical components.

Referring first to FIGS. 1 and 6, the control arms 16, 18 are illustrated as comprising a box beam fabricated by joining an outer plate 30 and an inner plate 32 preferably by longitudinally extending weldments W. A generally triangularly shaped gusset plate portion 34 extends inwardly from the inner plate 32 and includes an outwardly extending elongated slot 36 (as may be seen in FIG. 5) positioned centrally below the cross member 28 to provide flexibility as will be further discussed below.

The cross member 28 is secured to the gusset plate portion 34 and vertical portion of inner plate 32 by additional weldments W, and a pair of top reinforcing plates 38, 40 may be welded to the top surfaces of the control arms 16, 18 and the cross member 28 at their interface.

Referring next to FIG. 3, it can be seen that the forward end 19 of the control arm 18 is formed to curve generally upwardly and is traversed by a through bore 42. The bore 42 is sized to provide clearance for receiving a longitudinally inserted fastener such as the bolt illustrated at 44 in FIG. 1. A pivot hanger 46 is secured to the underside of the side rail 14 by suitable fasteners 45 and includes a mounting portion 47 sized for insertion in the open forward end 19 of control arm 18. It includes a resiliently mounted bushing 48, as may best be seen in FIG. 10, for receiving the bolt 44 for threaded engagement with nut 43 to provide a resiliently mounted pivotal bearing for the control arm 18. Lateral resilience in the mounting of the control arm 18 is provided by pads 49 of resilient material disposed on the sides of mounting portion 47 which are preferably formed as a unitary structure with the resilient material supporting the bushing 48.

The pivot hanger 46 further includes a downward extending stop portion 50 for limiting the pivotal movement of the control arm 18 in the clockwise direction as viewed in FIG. 1 through cooperation with open end 19 of crank arm during servicing when the vehicle may be lifted by its frame.

Referring now to FIGS. 3 and 6 to 9, the construction of the cross member 28 which effects improvements in vehicle manufacturing economy, reliability, and handling characteristics may be understood. The cross member 28 is essentially a simple channel member of U-shaped cross section which is preferably oriented with its open end downward as shown in FIG. 3 and which may employ a pair of internal reinforcing members 52 and two pairs of side reinforcing members 54 to enhance its fatigue strength.

Use of the simple U-channel construction in the cross member 28 reduces both the weight and the cost of the vehicle over those which employ other configurations such as T-section or I-section beams. It furthermore permits a flexibility of design in defining the vehicle's handling characteristics which is not otherwise possible with prior art rear wheel suspension systems of this general type. This derives from the fact that choice of the U-shape channel permits ready orientation of the cross member 28 in the downward opening position shown in the drawings so that the shear center of the cross member 28 is above the part and its pivotal axis in its installed position. This positioning of the cross member shear center has been found to be particularly advantageous in designing a motor vehicle in which an understeer characteristic is desired since differential movement of the control arms 16, 18 of a vehicle while turning forces the shear center axis of the cross member 28 into an angle relative to the body which urges the wheels into an understeer position.

Turning now to FIG. 6, it is shown, as previously described, that the advantageously shaped and positioned cross member 28 is secured by weldments W to the control arm inner plate 32, including its inwardly extending gusset plate portion 34. This latter connection provides the primary support for the torsionally loaded cross member 28. However, the transition at the inner edge 35 of gusset plate 34 from an open to a closed section beam results in a stress concentration which tends to reduce the life of the resulting structure upon application of repetitive loads, i.e. it reduces its fatigue strength.

In order to counteract this inherent condition in a simple, effective economical manner, the present invention employs certain new structural features. One of these is the central elongated slot 36 of the gusset plate portion 34. At minimal cost, inclusion of this feature provides flexibility to the gusset plate at the transition point, thereby reducing stress concentration.

A second related feature is the provision of the internal brace members 52 in cross member 28. These brace members 52 function to reduce stress concentration and improve fatigue strength by eliminating the abrupt transition from open to closed section beam. This may best be appreciated by referring to FIGS. 6 through 9 wherein the detailed construction of the reinforcing members 52 is illustrated.

Each reinforcing member 52 includes a horizontal portion 52A positioned proximate gusset plate portion 34 and traversing the inner edge 35 thereof as may best be seen in FIG. 6. An inclined portion 52B extends generally upwardly (preferably at an angle of 45 degrees with the horizontal) from the horizontal portion 52A to a position proximate a top inner surface 28A of the cross member 28. A cap portion such as shown at 52C may abut the surface 28A and incline downward to connect with inclined portion 52B. Horizontal portion 52A and inclined portion 52B define a continuous U-shaped cross section as may be seen in FIGS. 7 through 9, and the reinforcing members 52 are preferably fixedly secured to the cross member by weldments W between the sides 52D of the U-shaped portions 52A, 52B and inner side surfaces 28B of the cross member 28.

This construction and placement of the internal reinforcing members 52, particularly when used with the elongated slot 36 extending a transverse distance less than the length of horizontal portion 52A has been found to be of great value in enhancing fatigue strength by smoothing the beam section transition in the region of the gusset plate portion inner edge 35. Another strengthening feature that may be employed in this region is the securing by welding of the pairs of side plates 54 to the sides of the cross member 28. The plates 54 extend along the cross member length at least the length of the inner reinforcing members 52.

Strength and reliability of the invention rear wheel suspension apparatus 10 may be further enhanced by provision of the improved wheel support apparatus 20, 22.

The wheel support assemblies 20, 22 are illustrated in FIG. 1 as each comprising a support bracket assembly 56 and a wheel spindle 58.

The support brackets assembly 56 consist generally of a substantially rectangular spindle support plate portion 60, a pair of control arm attachment plate portions 62 extending perpendicularly therefrom, and a rectangular bolt plate 63 secured to the support plate portion 60.

The spindle support plate portion 60 includes (as may best be seen in FIG. 3) a central aperture 64 for receiving the bolt plate 63 and (as may best be seen in FIG. 4) an inclined tab portion 66, which, prior to assembly as shown in FIG. 4, may be inclined only slightly from the plane of support plate portion 60. The generally rectangular bolt plate 63 is inserted through the aperture 64 and includes shoulder portions 63A which abut the inner surface 60A of support plate portion 60 to prevent outward removal. The bolt plate 63 is preferably welded in place in this abutting position and threaded apertures 65 are formed therethrough.

Attachment plate portions 62 are spaced apart sufficiently to receive the lower ends of shock absorbers 24, 26 which are supported for pivotal movement therebetween by known fasteners 25, 27 carried by the control arms 16, 18. The attachment portions 62 include aligned, irregularly shaped apertures 68 configured to permit assembly of the brackets 56 by direct vertical engagement to the position shown in FIG. 4 wherein bottom surfaces 70 of attachment plate portions 62 abut the top surface 34A of gusset plate portion 34. In assembly of the invention suspension apparatus 10 the brackets 56 are preferably welded to the control arms 16, 18 when installed to this abutting position, and the tab portion 66 is then mechanically formed to the position shown in FIG. 4 and welded to the bottom of control arms 16, 18 as indicated at W.

Upon assembly of the brackets 56 to the control arms 16, 18 as described, the wheel spindle 58 is secured to the bolt plate 63 by suitable fasteners for mounting the vehicle wheels L, R.

While only one embodiment of the invention rear wheel suspension apparatus has been described, others are possible without departing from the scope of the appended claims.

What is claimed is:

1. A suspension apparatus for the rear wheels of a motor vehicle, the suspension apparatus comprising:
   A. a pair of rearward extending control arms;
   B. means for mounting one end of each said control arms for pivotal movement about an axis transverse to the longitudinal axis of said vehicle;
   C. means for rotatively supporting said vehicle rear wheels at the other end of each of said control arms; and
   D. a cross member extending transversely between said control arms, positioned longitudinally intermediate said ends, and defining a beam cross section so located with respect to said control arm pivotal axis and so configured that said cross member has a shear center positioned in a transverse plane located above said control arm pivotal axis.

2. A suspension apparatus as defined in claim 1 wherein said cross member comprises a channel member of generally U-shaped cross section having a base portion joined to a portion of said control arms proximate the horizontal plane of said pivotal axis and a pair of downward extending side portions thereby defining a beam section having a shear center located above said pivotal axis.

3. A suspension apparatus for the rear wheels of a motor vehicle, the suspension apparatus comprising:
   A. a pair of rearward extending control arms;
   B. means for mounting one end of each of said control arms for pivotal movement about an axis transverse to the longitudinal axis of said vehicle;
   C. means for rotatively supporting said vehicle rear wheels at the other end of said control arms; and
   D. a cross member of generally U-shaped, downward opening cross section extending transversely between and fixedly secured to said control arms, positioned longitudinally intermediate said control arm ends and located vertically at a position wherein the upper surface of said cross member is positioned proximate the horizontal plane of said control arm pivotal axis whereby the shear center of said cross member defines a transverse axis substantially parallel to and spaced upwardly from said control arm pivotal axis.

4. In a suspension apparatus for the rear wheels of a vehicle, the suspension apparatus being of the type having a pair of rearwardly extending control arms each having one end connected to said vehicle for pivotal movement about an axis transverse to the longitudinal axis thereof and means for rotatably supporting one of said rear wheels proximate the other end thereof, an improvement wherein said supporting means comprises:
   A. a bracket member having
      1. a pair of spaced vertically disposed control arm attachment plate portions having aligned apertures formed therethrough for receiving said control arm other end;
      2. a spindle support plate portion extending perpendicularly between said attachment plate portion and having an aperture formed therethrough;
      3. a bolt receiving plate having threaded apertures formed therein and having first portions abutting a surface of said support plate portions facing inwardly towards said vehicle longitudinal axis and a second portion projecting through said support plate aperture;
      4. means for fixedly securing said attachment plate portions to said control arm other end; and
      5. means for fixedly securing said bolt receiving plate to said support plate portion;
   B. a wheel spindle member adapted to rotatably support said vehicle wheel and having a flange portion abutting engaging said bolt receiving plate and having apertures formed therethrough registering with said bolt receiving plate threaded apertures; and
   C. threaded fastener means engaging said flange apertures in said bolt receiving plate threaded apertures for clampingly securing said spindle member to said bolt receiving plate.

5. The improvement as defined in claim 4 wherein said attachment plate apertures define a slot-like opening whereby said bracket may be moved into an abutting engagement with said control arm by displacement in a vertical direction normal to the longitudinal axis thereof and wherein said support plate portion includes a tab portion adjacent the opening of said slot-like aperture, said tab portion being readily deformable from a first position generally coplanar with said support plate portion wherein said displacement in said normal direction is permitted to a second position engaging a bottom surface of said control arm to prevent removal of said bracket member through movement in said vertical direction.

6. In a suspension apparatus for the rear wheels of a vehicle, the suspension apparatus being of the type having a pair of rearwardly extending control arms each having one end thereof connected to the vehicle for pivotal movement about an axis transverse to the longitudinal axis thereof and means for rotatably supporting one of said rear wheels proximate the other end thereof, an improvement wherein said supporting means comprises:
   A. a bracket fixedly secured to said control arms and including means defining an aperture through said bracket perpendicular to the longitudinal axis of said control arm;
   B. a fastener plate member insertable through said aperture in an outward direction with respect to the vehicle longitudinal center line to a position wherein a portion of said fastener plate abuts said bracket member to prevent outward removal of said fastener plate;
   C. a wheel spindle member adapted to rotatably support said wheel; and
   D. means for fastening said wheel spindle member to said fastener plate member.

* * * * *